July 12, 1966

E. S. ROCKS 3,260,122

GYROSCOPIC APPARATUS

Filed May 13, 1963

INVENTOR.
EUGENE S. ROCKS
BY
ATTORNEY

United States Patent Office 3,260,122
Patented July 12, 1966

1

3,260,122
GYROSCOPIC APPARATUS
Eugene S. Rocks, Northport, N.Y., assignor to Sperry Rand Corporation, Great Neck, N.Y., a corporation of Delaware
Filed May 13, 1963, Ser. No. 279,889
20 Claims. (Cl. 74—5.4)

This invention relates to gyroscopic apparatus.

Gyroscopic apparatus having rotors or sensitive elements which rotate as free elements are known as free rotor gyroscopes. Gyroscopes of this type consist of a spinning sphere rotating in a universal bearing where the bearing itself may be stationary or may rotate. Rotation of the universal bearing around an axis coincident with the normal spin axis of the rotor averages bearing torques which would otherwise cause the rotor to precess undesirably in inertial space. Misalignment of the rotation axis of the universal bearing and the spin axis of the gyroscope rotor generally coerces the rotor to precess towards to axis of rotation of the bearing because of viscous coupling therebetween.

Examples of gyroscopes of this type are disclosed in U.S. Patent 3,058,359 entitled "Fluid Rotor Gyroscopic Apparatus," issued October 16, 1962 to W. G. Wing and U.S. patent application S.N. 232,713 entitled "Gyroscopic Apparatus," filed in the name of G. J. Watt on October 24, 1962.

For purposes of example, the present invention will be described with respect to a free rotor ball gyro having a spherical sensitive element or rotor universally suspended within a spherical cavity in a rotating housing. The spherical cavity forms a universal fluid bearing and contains fluid which completely surrounds the spherical rotor. Under these conditions the spherical rotor tends to maintain a fixed orientation in space despite changes in the orientation of the rotor housing thereby causing the spin axis of the rotor to deviate from the spin axis of the rotor housing until the viscous shear torques of the surrounding fluid precess the rotor spin axis into alignment with the rotor housing spin axis which occurs over a period of time. Thus the dynamic response of a gyroscope of this type can be adapted to provide rate or displacement information about one or more axes.

The present invention is particularly suitable for use in extremely high acceleration environments due to its unique configuration. In the present invention, the inner gimbal and rotor bearing are one and the same thus precluding the possibility of relative yielding of the rotor with respect to the gimbal. Such yielding restricts the application of conventional gyroscopes to situations in which relatively low accelerations are encountered. This non-yielding feature also provides inherent acceleration compensation because the spinning gyro rotor is also the gyro gimbal and because gimbal rotation often averages the effects of undesirable applied torque. Fluid flotation also converts the concentrated forces that are exerted on the floated element to less harmful distributed pressure forces. Additional advantages of the present invention include simplicity and inherent reliability as well as relatively low manufacturing cost.

It is therefore a primary object of the present invention to provide extremely accurate gyroscopic apparatus of the free rotor type.

It is an additional object of the present invention to provide gyroscopic apparatus having minimum mass unbalance with respect to the sensitive element.

It is a further object of the present invention to provide gyroscopic apparatus suitable for extremely high acceleration environments.

It is a further object of the present invention to provide gyroscopic apparatus that is extremely accurate, in-

2 herently reliable, and relatively inexpensive to manufacture.

It is another object of the present invention to provide gyroscopic apparatus that is self-contained such that electrical connections or fluid connections extending exteriorly of the rotating members are eliminated thereby eliminating rotating fluid joints and sliding electrical connections.

These and other objects of the present invention are accomplished by mounting a free gyroscopic rotor in a fluid within a cavity of a rotating rotor housing. An eddy current pump is disposed within the rotor housing to provide pressure fluid for maintaining the rotor centered within the cavity thereby eliminating rotating fluid joints. Pick-off signals representative of the relative difference between the spin axis of the rotor and that of the rotor housing are directed exteriorly of the rotor housing by means of magnetic field shaping elements to pick-off coils on a stationary outer housing while torquing signals are applied from torquer coils on the stationary outer housing to the rotor by means of said magnetic field shaping elements thereby eliminating brush and slip ring elements and the undesirable frictional and wear effects associated therewith from acting on the rotor or rotor housing.

Referring to the drawings.

Figure 1:
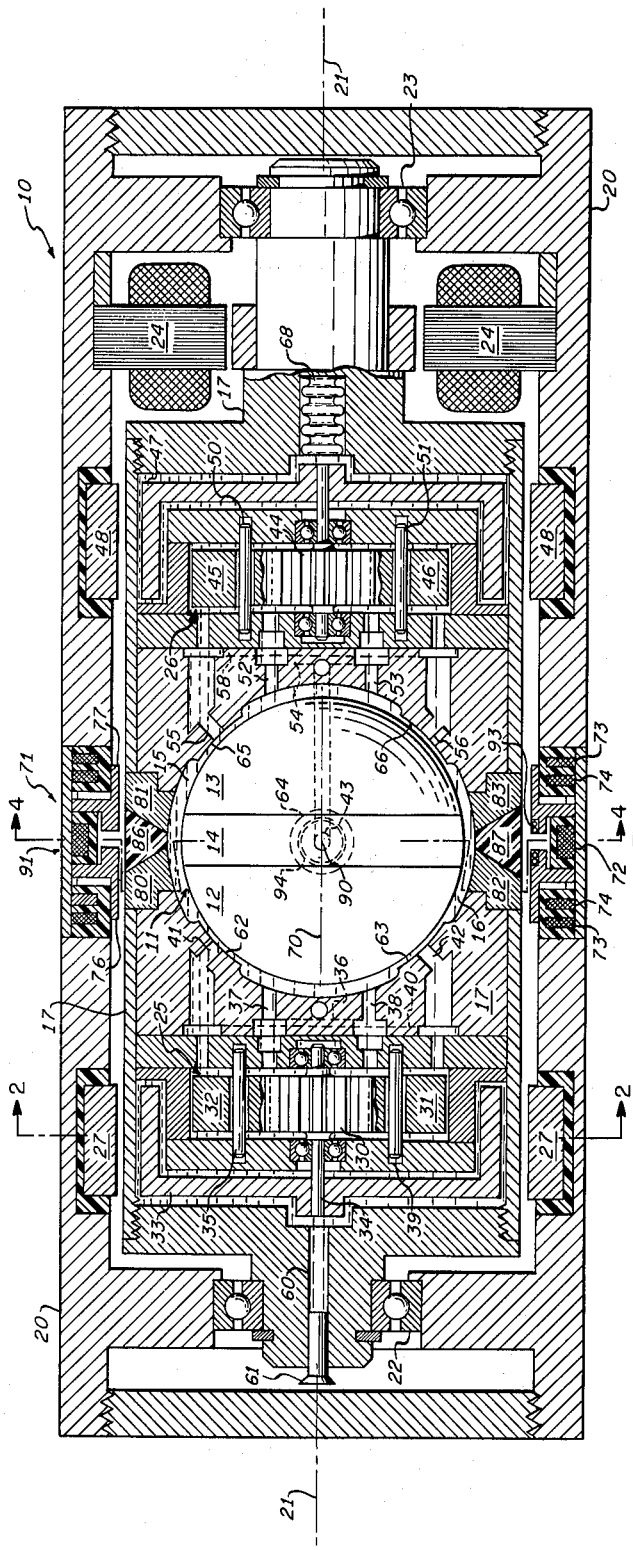
FIG. 1 is an elevation view partly in section of a free rotor gyroscope incorporating the present invention.

Referring to FIG. 1, the present invention will be described with respect to a two degree of freedom gyroscope apparatus 10 having a spherical sensitive element or gyroscopic rotor 11. The rotor 11 may consist of two semi-spherical hollow elements 12 and 13 having a permanent magnet bar or ring 14 disposed therebetween to form a hollow rotor having magnetic characteristics generally similar to the solid rotor described in said U.S. application S.N. 232,713. The elements 12 and 13 may be made of magnesium, beryllium or aluminum while the permanent magnet element may be Alnico®. Alternatively, the rotor 11 may have locally magnetized areas in a manner similar to that described in U.S. patent application S.N. 235,721, now Patent No. 3,219,889, entitled "Magnetized Element, Method of Magnetizing Same and Apparatus for Magnetizing Same," filed November 6, 1962 in the name of A. Polushkin.

The rotor 11 is suspended in a fluid 15 within a spherical cavity 16 within a rotatable rotor housing 17. When the apparatus 10 is used as a gyroscope the cavity 16 contains a fluid 15 preferably having a density that is equal to that of the spherical rotor 11 thereby rendering the rotor 11 effectively weightless and insensitive to acceleration effects. A suitable fluid is fluorocarbon FC 75. The fluid 15 is a dielectric and compatible with the rotor 11 to minimize corrosion and other undesirable chemical effects.

The rotor housing 17 is rotatably mounted within a hollow cylindrical main support or outer housing 20 for rotation around an axis 21 defined by spaced ball bearings 22 and 23. The rotor housing 17 is spun by means of a spin motor 24 which has its stator mounted on the outer housing 20 and its armature mounted on the rotor housing 17.

Figure 2:
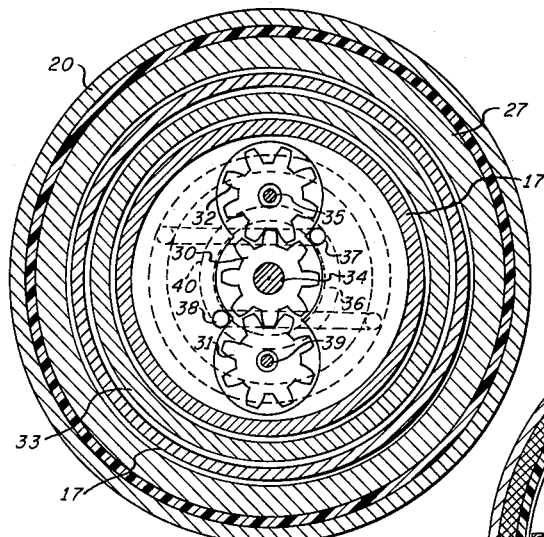
FIG. 2 is a sectional view of FIG. 1 taken along the line 2—2.

Fluid under pressure to center the rotor 11 within the cavity 16 is provided by spaced eddy current rotary gear pumps 25 and 26 which are disposed on opposite sides of the cavity 16. The pumps 25 and 26 are identical. Referring to FIGS. 1 and 2, the rotary gear pump 25 includes a center gear 30 which meshes with side gears 31 and 32. The center gear 30 is connected to an eddy current drag disc 33 by means of a shaft 34. The side gears 31 and 32 rotate about their respective shafts 39 and 35. The eddy current drag disc 33 may be of aluminum and acts as a rotor that cooperates with an annular permanent magnet stator 27 mounted on the inner surface of the outer housing 20. All of the elements of the pump 25 with the exception of the permanent magnet stator 27 are disposed within the rotor housing 17 to provide a self-contained pump and fluid pressure source in a manner to be more fully explained. The fluid 15 in the spherical cavity 16 is ported to the inlet manifold 36 of the pump 25 by means of pump inlet conduits 37 and 38. The pump discharge is connected to the pump outlet manifold 40 which in turn is connected to provide the fluid 15 now under pressure to the cavity 16 through the orifices 41, 42 and 43, the latter being shown on the dotted lines. The pressure fluid 15 from the orifices 41, 42 and 43 impinges upon the rotor 11 to maintain it centered.

Similarly, the rotary gear pump 26 consists of a center gear 44 and side gears 45 and 46. The center gear 44 is connected to an eddy current drag disc or rotor 47 which is cooperative with an annular permanent magnet stator 48 mounted on the outer housing 20. The gears 45 and 46 rotate about their respective shafts 50 and 51. Fluid 15 from the cavity 16 is similarly conducted through the pump inlet conduits 52 and 53 to the inlet manifold 54 and discharged through orifices 55, 56 and 57 from the pump outlet manifold 58. The orifice 57 is not shown in FIG. 1 since it is disposed in front of the cavity 16 and aligned with the orifice 43 but can be seen in FIG. 4. The orifices 41, 42, and 43, 55, 56, and 57 cause the fluid 15 under pressure to impinge upon the rotor 11 along three mutually orthogonal axes defined by the respective pairs of orifices 41 and 56, 42 and 55, and 43 and 57, respectively, which intersect at the center of the cavity 16. All of the elements of the pump 26 with the exception of the permanent magnet stator 48 are disposed within the rotor housing 17 in a manner similar to the pump 25 thereby providing a completely self-contained pressure fluid source which eliminates any rotating fluid joints.

The fluid 15 may be inserted within the rotor housing 17 by means of a conduit 60 having a filling cap 61. The orifices 41, 42, 43, 55, 56 and 57 are disposed within respective support pads 62, 63, 64, 65, 66 and 67 (67 being shown in FIG. 4). The surfaces of the support pads 61 to 67 define the spherical opening in the cavity 16 within which the rotor 11 is positionably disposed. The rotor 11 is normally supported with its center coincident with the common center of the support pads 62 to 67, i.e., the center of the cavity 16. The pressure fluid 15 acting through the orifices and the respective support pads acts like linear springs to maintain the rotor 11 centered in stable equilibrium. A fluid expansion bellows 68 may also be disposed within the rotor housing 17 to provide for expansion or contraction of the fluid 15.

The gyroscopic apparatus 10 further includes electromagnetic elements which provide the functions of detecting the position of the spin axis 70 of the rotor 11, of precessing the rotor 11 and of spinning the rotor 11. The pick-off and torquing device 71 of the present invention is similar in many respects to that described in said U.S application S.N. 232,713. One of the principal differences is that in the present invention, the pick-off and torquing signals are directed between the rotor 11 and the outer housing 20 without requiring brush and slip ring elements which introduce friction and cause deterioration of the signal characteristics. The combined electromagnetic pick-off and torquer 71 includes pick-off, torquing and decoupling coils 72, 73 and 74, respectively. The pick-off and torquing coils 72 and 73 are cooperative with the magnet 14 disposed within the rotor 11. The materials from which the rotor 11 is made are non-conductive to prevent hysteresis and eddy current coupling to external electromagnetic fields.

The pick-off, torquing and decoupling coils 72, 73 and 74 respectively define planes which are normal to the axis 21 of the outer housing 20 upon which they are mounted. The pick-off and decoupling coils 72 and 74 respectively are so arranged and the configuration of the air gaps 75 in the saliencies 76 and 77 is so chosen that the pick-off coil 72 is cut by a maximum while the decoupling coil 74 is cut by a minimum of the flux generated by the magnet 14. Further, the pick-off and decoupling coils 72 and 74 respectively are so wound and connected and the configuration of the shielding 78 is so chosen that the mutual inductance between the pick-off and decoupling coils 72 and 74 respectively and the torquing coil 73 is zero. In addition, the saliences 76 and 77 are designed such that a minimum reluctance path exists for the flux emanating from the magnet 14 when its poles are aligned with the saliences 76 and 77 in a plane normal to the axis of rotation 21. At the same time the design of the saliences 76 is such that a constant reluctance path for the flux of the magnet 14 exists throughout a symmetrical region of rotation of the magnetic axis of the magnet 14 out of a plane normal to the axis of rotation 21.

Figure 3:
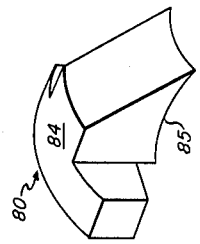
FIG. 3 is an enlarged perspective view of one of the pole shoes of FIG. 1.

In order to conduct the magnetic flux from the magnet 14 in the spinning rotor 11 to cooperate with the pick-off and torquer coils 72 and 73 respectively on the stationary outer housing 20, four high permeability pole shoes 80, 81, 82 and 83 are mounted on the rotor housing 17. As shown in FIGS. 1 and 3, each of the pole shoes, for example, 80 has a portion 84 that cooperates with its respective saliency and a portion 85 that cooperates with its respective extremity of the magnet 14. The pole shoes 80 and 81 form a cooperative pair of flux-conducting structures disposed between and cooperative with one extremity of the magnet 14, for example, the north extremity, and the saliences 76 and 77 respectively while the pole shoes 82 and 83 similarly form a cooperative pair disposed between and cooperative with the other extremity of the magnet 14, for example the south extremity, and the saliences 76 and 77 respectively. A low permeability filler 86 is disposed between the pole shoes 80 and 81 while a similar filler 87 is disposed between the pole shoes 82 and 83.

Figure 4:
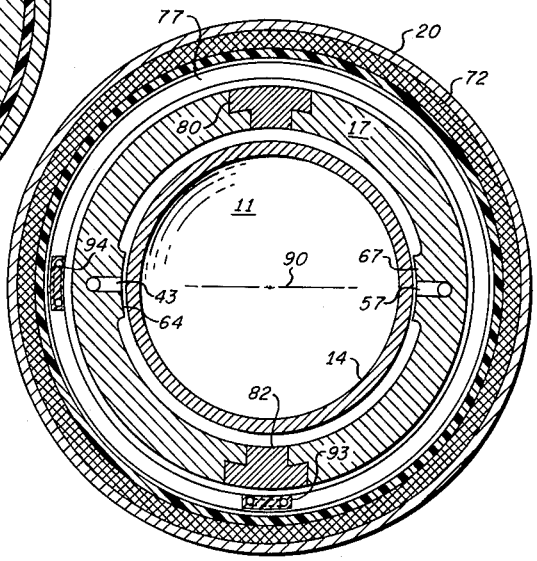
FIG. 4 is a section view of FIG. 1 taken along the line 4—4.

The pole shoes 80, 81, 82 and 83 are arranged in order that their portions 84 are slightly shorter than the corresponding dimension of the saliency with which it is cooperative in the direction of the axis 21. The portions 85 overlap the cooperative extremity of the magnet 14 in order that motion of the magnet 14 around the axis 90 in the the plane of the paper results in very little relutance change and therefore no elastic restraint. As shown in FIG. 4, the portions 85 have arcuate dimensions approximately equal that of the cooperative extremity of the magnet 14 in order that motion of the magnet 14 around the axis 21 results in a large reluctance change and therefore there is a large elastic restraint about the spin axis 21 which tends to keep the rotor 11 in synchronism with the rotating rotor housing 17 around the axis 21. The large area formed by the portion 84 between the respective pole shoes and the saliences insures a good flux path from the rotating rotor housing 17 to the magnetic circuit which contains the pick-off and torquer coils 72 and 73, respectively. The length of the saliences in the direction of the axis 21 is made greater than the corresponding length of the portions 84 of the respective pole shoes in order to make the pick-off 91 insensitive to motion of the magnetic structure on the outer housing 20.

Figure 5:
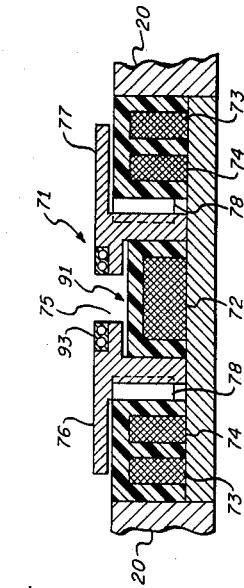
FIG. 5 is an enlarged sectional view of one side of the pick-off and torquing device of FIG. 1.

As shown more clearly in the enlarged view of FIG. 5, the pick-off 91 comprises a pick-off coil 72 mounted on the outer housing 20 in the equatorial plane of the rotor 11 and the permanent magnet 14 disposed within the rotor 11. The pick-off coil 72 passes through the salient poles 76 and 77. The pick-off coil 72 extends around the inner periphery of the outer housing 20.

When the spin axes 70 and 21 of the rotor 11 and the rotor housing 17 respectively are aligned, the pick-off coil 72 and the magnet 14 are coplanar throughout each rotation and no pick-off output results. Should a spin axis angular offset be present, however, it is reflected in an equal offset of the plane of rotation of the magnet 14 with that of the pick-off coil 72. When this happens, those portions of the coil 72 opposite the poles of the magnet 14 sweep back and forth past the poles, undergoing one cycle of oscillation for each rotation of the instrument 10. The interaction between coil and magnet flux induces a sinusoidal E.M.F. in the pick-off coil 72. The amplitude of the E.M.F. is proportional to the error angle and, with correct loading on the pick-off output, the device is free of coercion tendencies.

By itself the pick-off output provides only a rotating vector quantity giving no indication of error direction and sense. To complete the error-detecting function of the pick-off 91, therefore, it is necessary to establish a reference voltage with which the pick-off signal can be compared in phase. The comparison establishes a phase angle between the pick-off signal and reference which represents the angular coordinate of a pick-off output which is coded in polar form. As described in succeeding paragraphs, this output may either be used directly or it may be resolved into its orthogonal components. For either case, however, the primary rotational reference may be provided by an alternator generator in a manner disclosed in said U.S. patent application S.N. 232,713 or preferably by means of a rotary pulse generator 92 having reference coils 93 and 94 mounted on the inner periphery of the outer housing 20 that are orthogonally arranged with respect to each other. The coils 93 and 94 define a set of sensitive axes fixed to the stationary outer housing 20 of the instrument 10 in a manner to be explained.

The pick-off 91 is effectively a self-excited permanent magnet generator and provides a signal when there is misalignment between the rotor spin axis 70 and the normal to the pick-off coils plane, i.e., axis of rotation 21. Since this is also the source of viscous or eddy current coercion, the pick-off signal may be used to precisely detect and compensate coercion. The pick-off signal is synchronous with rotation of the magnet 14 and produces a signal proportional to spin axis misalignment suitable in a manner to be explained for servo control or direct feedback to the torquing coil 73. The magnet 14 need not rotate precisely in the plane defined by the pick-off coil 72 since translational misalignment produces no pick-off signal or coercion, as the pick-off 91 essentially detects only an angular discrepancy or difference in the alignment of the spin axes 70 and 21.

The torquer 95 includes a pair of coils 73, larger in diameter than the pick-off coil 72, but also symmetrically disposed about the equatorial plane of the rotor 11. When excited with an A.C. current of the proper phase, the coils 73 couple with the magnetic flux emanating from the rotor 11 to produce a directed torque proportional to current amplitude. Coupling between the pick-off 91 and the torquer 95 is inhibited by high permeability material shielding (not shown) and by a compensation coil 74, wound in series opposition with the pick-off coil 72, which serves to null the component of pick-off output attributable to torquer excitation. The decoupling coil 74 is located outboard of the pick-off coil 72 to minimize its effect on signal gradient.

Figure 6:
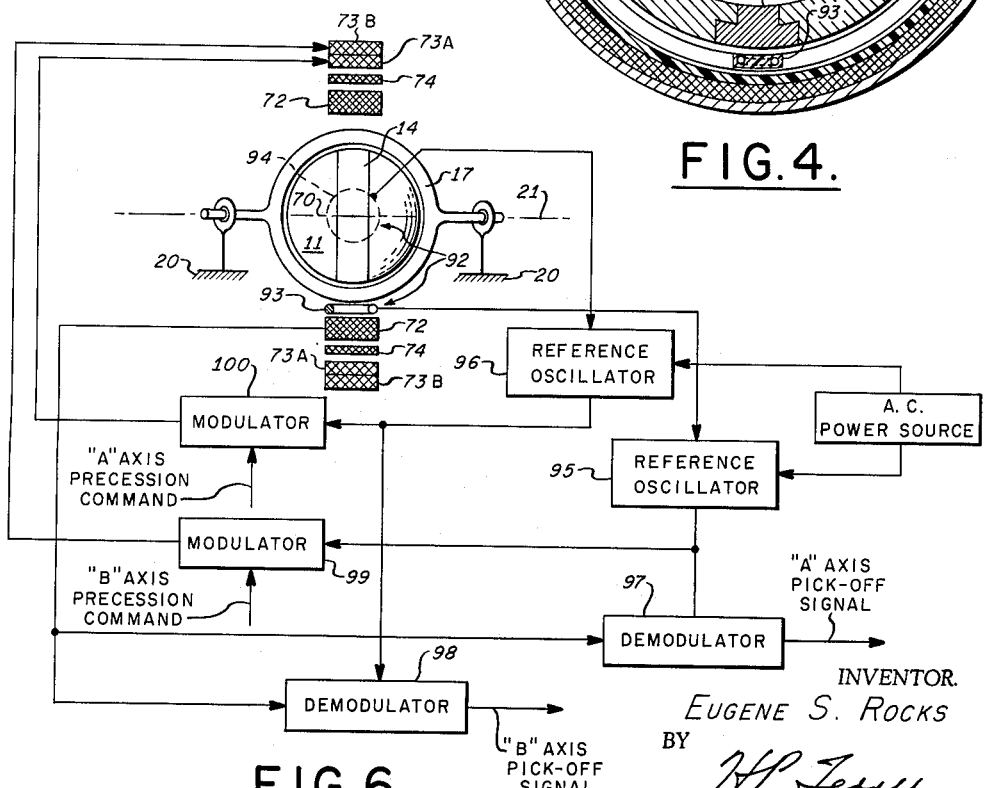
FIG. 6 is a schematic wiring diagram showing one application of the present invention.

Current may be provided to the torquing coils 73 from an alternator generator as explained in said U.S. patent application 232,713 or as shown in FIG. 6 in a manner to be explained, so that the amplitude and phase of the current in the torquing coil 73 can be controlled. The magnet 14 reacts only to a magnetic field which has a component along the spin axis 70 and varies synchronously with rotation. If the peak amplitude of the oscillating field is proportional to the speed of rotation, precession of the rotor 11 will be unaffected by rotational speed but only by amplitude. The direction of precision is controlled by the phase of the field relative to the magnet 14.

Since the pick-off and torquer coils 72 and 73 respectively are concentric, mutual inductive coupling exists between them. This is not serious with respect to the pick-off signal back into the torquer coils 73, however, the current in the torquer coils 73 will produce an undesirable signal in the pick-off coil 72. Compensation is provided by a decoupling coil 74 which is inductively coupled to the torquer coil 73. The decoupling coil 74 is connected in phase opposition with the pick-off coil 72 thereby compensating for the undesirable signal in the pick-off coil 72 in a manner more fully explained in said U.S. patent application 232,713.

The saliences 76 and 77 which surround the pick-off and torquer assembly tend to cause the magnet 14 in the rotor 11 to become aligned therewith in order to maintain a minimum reluctance path for the magnetic flux. This serves two functions (1) it causes the rotor 11 to spin synchronously with the rotor housing 17, and (2) it causes the magnet 14 to lie in the plane of the pick-off coil 72. If the magnet 14 lies slightly outside this plane, it is inconsequential since a pick-off signal only results from angular misalignment of the spin axis 70 with respect to the axis 21. Once the rotor 11 is floated, it seeks the minimum reluctance path and thus may be brought up to speed synchronously by means of the saliences 76 and 77.

In operation, the spin motor 24 spins the rotor housing 17 in synchronism with the frequency of power supplied to its stator. Viscous drag forces of the fluid 15 torque the rotor 11 about the axis 21 while the magnet 14 locks into alignment opposite the saliences 76 and 77 thereby causing the rotor 11 to spin at the same speed as that of the rotor housing 17. When transients due to initial spin-up have disappeared, the rotor 11 is a free gyro wheel except for small coercion effects at spin frequency which are averaged to zero, and spins synchronously with the rotor housing 17.

As the rotor housing 17 rotates, the eddy current drag discs 33 and 47 tend to rotate with it. However, the stationary permanent magnets 27 and 48 induce eddy currents in the discs 33 and 47 respectively. The magnetic fields caused by the induced eddy currents produce a torque which acts in a direction to resist this action thereby causing each of the discs 33 and 47 to rotate at a speed less than that of the rotor housing 17. This relative rotation of the discs 33 and 47 with respect to the rotor housing 17 in effect causes the center gears 30 and 44 to drive their respective outer side gears 31 and 32, 45 and 46 to provide the desired pumping action from the pumps 25 and 26 with a minimum of additional loading on the spin motor 24. The fluid 15 is pumped from the pumps 25 and 26 to the respective outlet manifolds 40 and 58 and thence through the orifices 41, 42, 43, 55, 56 and 57 to impinge upon the rotor 11 to compensate for minor flotation errors and maintain the rotor 11 centered within the cavity 16. Any tendency of the rotor 11 to deviate from the center of the cavity 16 is corrected by the increased fluid pressures adjacent the support pads towards which the rotor 11 has moved and the decreased fluid pressures adjacent the support pads from which the rotor 11 has moved. The resultant force generated by this difference in fluid pressures is appreciable and tends to maintain the rotor 11 accurately centered with the cavity 16.

For example, the centering action sufficient to constrain the rotor eccentricity to within twenty percent of the total clearance in the presence of 200 g's and a 1° C. flotation error using a 1″ diameter rotor can be provided by a pair of eddy current rotary gear pumps which each deliver 11.9 cm.$^3$/sec. of fluorocarbon FC 75 at 1.64 p.s.i. where 5.6 cm.$^3$/sec. is delivered to the cavity 16 and 6.3 cm.$^3$/sec. is pump leakage. The power required to drive each pump, i.e., applied to the rotor housing 17 is 2.66 watts. The flux density in each eddy current disc preferably averages 180 gauss distributed over 2 radians. This includes both entering and emerging flux, i.e., each may be distributed over one radian.

As explained previously, the fluid 15 and the rotor 11 preferably are of the same density. In order to maintain the density of the fluid 15 substantially constant, the gyroscope apparatus 10 includes conventional temperature control equipment not shown for purposes of simplicity.

The magnitude and direction of the angle between the axis of rotation 21 and the inertially fixed direction of the rotor spin axis 70 are determined by the amplitude and phase of the voltage generated in the pick-off coil 72 by the magnet 14.

The pick-off output, when compared in phase with an appropriate reference voltage at the same frequency, appears as an error signal coded in polar coordinates. This signal may be used directly or it may be resolved depending on the torquing mode of operation desired.

FIG. 6 is a schematic circuit diagram showing one embodiment of how torquing commands are processed to precess the rotor 11 about either or both of its two orthogonal input-output axis A and B, where A and B are any two orthogonal axes in the plane normal to the axis 21, and how angular displacement of the spin axis 70 of the rotor 11 with respect to the axis of rotation 21 of the rotor housing 17 is presented in the form of two D.C. signals representative of angular displacement about the respective axes A and B.

The purpose of the rotary pulse generator 92 is to provide the phase and frequency reference required (a) to resolve the signal from the pick-off 91 into two orthogonal components and (b) to introduce precession command torques about one or both orthogonal input axes. The reference generator 92 consists of a pair of coils 93 and 94 mounted orthogonally on the outer housing 20 and oriented so the full flux from the N–S poles of the magnet 24 links each coil twice during each revolution of the rotor housing 17. The amplitudes of the resulting pulses are unimportant, their frequency and phase alone being required to synthesize the appropriate phase references.

The signals from the two orthogonal reference coils 93 and 94 are connected to trigger two reference oscillators 95 and 96 respectively to produce two alternating voltages locked in phase and frequency with the rotor 11. These voltages are in quadrature with each other and they are the electrical reference signals which define the orthogonal gyro input-output axes A and B. The oscillators 95 and 96 are in turn connected to demodulators 97 and 98 respectively.

The pick-off coil 72 is also connected to the demodulators 97 and 98 in order that demodulating the pick-off signal using the signals from the oscillators 95 and 96 as a reference yields D.C. voltages having a magnitude and polarity representative of the amount and direction of the deviation of the rotor spin axis 70 with respect to the rotor housing axis of rotation 21 about each of the axes A and B. This is in effect the electrical resolution of the pick-off signal into orthogonal components by means of the demodulators 97 and 98.

The reference oscillators 95 and 96 are also connected to modulators 99 and 100 respectively which in turn are connected to torquer coils 73A and B respectively. As indicated by the legends, precession command signals with respect to the A and B axes are connected to the modulators 100 and 99 respectively. The precession command signals for the A and B axes may include the pick-off signals from the demodulators 97 and 98 respectively for automatically returning the rotor 11 to its normal orientation depending upon the type of dynamic gyroscopic operation desired.

By modulating the D.C. precession command signal for a particular axis, for example, the A axis, with the reference voltage for a particular gyro input axis from its associated oscillator, for example, the oscillator 96 and the modulator 100, an A.C. current is generated which has the required magnitude, phase, and frequency to produce an A.C. flux in the torquer coil A that interacts with the permanent magnet 14 in the rotor 11 to precess the rotor 11 about the particular input axis A, at a rate proportional to the original D.C. precession command signal.

If it is desired to maintain a particular saliency cooperative with a particular magnetic pole following restart, a simple phase-sensing circuit (not shown) may be provided with a capacitance bridge, capacitive plates located on the ball and on the rotating bearing and a relay. In the event of a magnet reversal, the bridge unbalance will operate for example, to reverse the phasing of the reference oscillator leads. Alternatively, conventional mechanical devices may be utilized to limit the relative movement of the rotor 11 with respect to the cavity 16 to eliminate the possibility of 180° rotation about the spin axis 21. Since in normal operation the rotor movement with respect to the rotor housing about the axis 21 is limited to very small angles, this does not impose a limitation upon operation.

Although the phase reference has been described as derived from the rotary pulse generator 82, it will be appreciated that alternatively it may be derived optically, magnetically or electrostatically.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:
1. Inertial apparatus comprising,
 (a) rotor means,
 (b) rotor housing means having a cavity of substantially the same shape as that of said rotor means within which said rotor means is positionably disposed,
 (c) fluid within said cavity for supporting said rotor means,
 (d) support means within which said rotor housing means is mounted for rotation about an axis,
 (e) means for rotating said rotor housing means about said axis so as to thereby rotate said fluid and said rotor means,
 (f) means including fluid pump means within said rotor housing means for introducing said fluid into said cavity under pressure to maintain said rotor means centered within said cavity, and
 (g) means responsive to the relative angular movement of the axis of rotation of said rotor means with respect to that of said rotor housing means for providing a signal representative thereof.

2. Inertial apparatus comprising,
 (a) rotor means,
 (b) rotor housing means having a cavity of substantially the same shape as that of said rotor means within which said rotor means is positionably disposed,
 (c) fluid within said cavity for supporting said rotor means, (d) support means within which said rotor housing means is mounted for rotation about an axis,
(e) means for rotating said rotor housing means about said axis so as to thereby rotate said fluid and said rotor means,
(f) means including fluid pump means within said rotor housing means for introducing said fluid into said cavity under pressure to maintain said rotor means centered within said cavity, and,
(g) pick-off and torquing means having one portion mounted on said support means and another cooperative portion mounted on said rotor means for providing a signal representative of the misalignment of the axis of rotation of said rotor means with respect to that of said rotor housing means and for precessing said axes into alignment.

3. Apparatus of the character described in claim 2 in which said pick-off and torquing means includes signal path defining means mounted on said rotor housing means between said cooperative portions for defining the signal path therebetween as to thereby eliminate friction producing connections normally required for this purpose.

4. In inertial apparatus,
(a) substantially spherical rotor means,
(b) rotor housing means having a cavity of substantially the same shape as that of said rotor means within which said rotor means is positionably disposed,
(c) a fluid within said cavity for supporting said rotor means for universal movement, and
(d) means including fluid pump means within said rotor housing means for introducing said fluid into said cavity under pressure to maintain said rotor means centered within said cavity.

5. In inertial apparatus,
(a) a substantially spherical rotor,
(b) a rotor housing having a substantially spherical cavity within which said rotor is adapted to move,
(c) a fluid contained within said spherical cavity for supporting said rotor,
(d) means including fluid pump means within said rotor housing adapted to introduce said fluid into said cavity under pressure to impinge against said rotor and to tend to maintain said rotor centered therein,
(e) a main support within which said rotor housing is mounted with freedom to rotate about an axis, and
(f) means to rotate said rotor housing about said axis thereby spinning said fluid and said rotor.

6. In inertial apparatus,
(a) substantially spherical rotor means,
(b) rotor housing means having a substantially spherical cavity within which said rotor is adapted to move,
(c) a substantially incompressible fluid contained within said rotor housing means and said spherical cavity for supporting said rotor means,
(d) means including fluid pump means within said rotor housing means adapted to introduce said fluid into said cavity to impinge against diametrically opposed portions of said rotor for tending to maintain said rotor means centered within said cavity,
(e) support means within which said rotor housing means is mounted for rotation about an axis, and
(f) drive means for rotating said rotor housing about said axis thereby spinning said fluid and said rotor means.

7. In apparatus of the character described in claim 6 in which said fluid pump means includes at least one eddy current rotary gear pump.

8. In apparatus of the character described in claim 6 further including means responsive to the relative angular movement of said rotor housing means spin axis and the rotor means spin axis for providing a measure in accordance therewith and means for directing said angular movement measure exteriorly of said rotor housing whereby friction producing connections between said rotor housing means and said support means are eliminated.

9. In apparatus of the character described in claim 6 further including pick-off and torquing means having one portion mounted on said rotor means and another portion on said support means and including means mounted on said rotor housing means for directing signals between said one and another portions whereby friction producing connections normally required for this purpose are eliminated.

10. In apparatus of the character described in claim 6 in which the density of said rotor means is substantially equal to the density of said fluid.

11. In gyroscopic apparatus,
(a) substantially spherical rotor means,
(b) rotor housing means having a substantially spherical cavity within which said rotor means is universally adapted to move,
(c) a substantially incompressible fluid contained within said rotor housing means and said spherical cavity for supporting said rotor means,
(d) support means within said rotor housing means is mounted for rotation about an axis,
(e) drive means for rotating said rotor housing about said axis thereby spinning said fluid and said rotor means synchronously with said rotor housing, and
(f) means including at least one eddy current fluid pump means adapted to introduce said fluid into said cavity to impinge against a plurality of diametrically opposed portions of said rotor means for maintaining said rotor means centered within said cavity, said fluid pump means including a rotary gear pump connected to be driven by an eddy current disc rotatably mounted with respect to said rotor housing about said axis, and permanent magnet means mounted on said support means and cooperative with said eddy current disc for inducing eddy currents therein.

12. In apparatus of the character described in claim 11 in which said eddy current fluid pump means includes a center drive gear connected to said eddy current disc and a pair of driven gears driven by said center gear.

13. In apparatus of the character described in claim 11 in which a pair of identical spaced eddy current fluid pumps are disposed on diametrically opposed portions of said cavity.

14. In gyroscopic apparatus of the type having a rotor rotatably supported within a cavity in a rotor housing that is adapted for rotating about an axis within an outer housing,
(a) first and second diametrically opposed peripheral portions of said rotor being magnetized,
(b) pick-off means having one portion mounted on said outer housing and cooperative with said magnetized portions of said rotor for providing a signal in accordance with the deviation of the spin axis of said rotor from a predetermined orientation,
(c) torquing means having one portion mounted on said outer housing and cooperative with said magnetized portions of said rotor for applying a torque to said rotor, and
(d) flux shaping means mounted on said rotor housing between said portions of said pick-off and torquing means and said magnetized portions for directing magnetic flux between said relatively rotatable members without requiring friction producing elements.

15. In gyroscopic apparatus comprising,
(a) substantially spherical rotor means,
(b) first and second diametrically opposed peripheral portions of said rotor means being magnetized,
(c) rotor housing means having a substantially spherical cavity within which said rotor means is positionably disposed,
(d) support means within which said rotor housing means is rotatably mounted for rotation about an axis, and (e) pick-off and torquing means having pick-off and torquer windings mounted on said support means and cooperative with said magnetized portions of said rotor, said pick-off and torquing means further including magnetic flux shaping pole shoe means mounted on said rotor housing means and disposed between said pick-off and torquer windings and said magnetized portions of said rotor means for directing magnetic flux therebetween.

16. In apparatus of the character described in claim 15 further including means including fluid pump means disposed within said rotor housing means for directing fluid into said cavity under pressure to maintain said rotor means centered within said cavity.

17. In inertial apparatus,
(a) substantially spherical rotor means,
(b) first and second diametrically opposed peripheral portions of said rotor means being magnetized,
(c) rotor housing means having a substantially spherical cavity within which said rotor means is positionably disposed,
(d) support means within which said rotor housing means is rotatably mounted for rotation about an axis,
(e) pick-off means having one portion mounted on said support means and cooperative with said magnetized portions of said rotor for providing a signal in accordance with the deviation of the spin axis of said rotor means for a predetermined orientation,
(f) torquing means having one portion mounted on said support means and cooperative with said magnetized portions of said rotor for applying a torque to said rotor means, and
(g) flux shaping means mounted on said rotor housing means and cooperative with said pick-off and torquing means and said magnetized portions of said rotor for directing magnetic flux between said magnetized portions and said pick-off and torquing means whereby friction producing electrical connections between the relatively rotating elements are eliminated.

18. In apparatus of the character recited in claim 17 further including means including reference signal generating means mounted on said support means and cooperative with said magnetized portions of said rotor means for resolving said pick-off signal.

19. In apparatus of the character recited in claim 17 further including means including reference signal generating means mounted on said support means and cooperative with said magnetized portions of said rotor means for resolving said pick-off signal into two orthogonal components associated with respective axes and for introducing precession command torques about at least one of said axes.

20. In apparatus of the character recited in claim 19 in which said reference signal generating means includes first and second orthogonally mounted coils responsive to said magnetic flux during each revolution of said rotor means.

References Cited by the Examiner

UNITED STATES PATENTS

| | | | |
|---|---|---|---|
| 2,857,767 | 10/1958 | Werndl | 74—5.37 |
| 2,903,891 | 9/1959 | Sedgfield | 74—5.4 |
| 2,940,318 | 6/1960 | Adams et al. | 74—5 |
| 3,058,359 | 10/1962 | Wing | 74—5.6 |
| 3,117,456 | 1/1964 | Wing | 73—503 |

MILTON KAUFMAN, *Primary Examiner.*

SAMUEL FEINBERG, *Examiner.*

R. F. STAHL, *Assistant Examiner.*